(12) United States Patent
Piqueras Jover et al.

(10) Patent No.: US 11,108,747 B2
(45) Date of Patent: *Aug. 31, 2021

(54) DECENTRALIZED AND DISTRIBUTED SECURE HOME SUBSCRIBER SERVER DEVICE

(71) Applicant: AT&T Intellectual Property I, L.P., Atlanta, GA (US)

(72) Inventors: Roger Piqueras Jover, Brooklyn, NY (US); Joshua Lackey, Lake Stevens, WA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 632 days.

This patent is subject to a terminal disclaimer.

(21) Appl. No.: 16/037,352

(22) Filed: Jul. 17, 2018

(65) Prior Publication Data

US 2018/0324157 A1 Nov. 8, 2018

Related U.S. Application Data

(63) Continuation of application No. 15/497,264, filed on Apr. 26, 2017, now Pat. No. 10,057,222, which is a
(Continued)

(51) Int. Cl.
*H04L 29/06* (2006.01)
*H04L 9/30* (2006.01)
*H04L 9/32* (2006.01)
*H04W 12/06* (2021.01)
*H04W 12/04* (2021.01)
*H04W 12/72* (2021.01)

(52) U.S. Cl.
CPC ............ *H04L 63/0442* (2013.01); *H04L 9/30* (2013.01); *H04L 9/321* (2013.01); *H04L 9/3271* (2013.01); *H04L 63/0428* (2013.01); *H04L 63/061* (2013.01); *H04W 12/04* (2013.01); *H04W 12/06* (2013.01); *H04L 63/0823* (2013.01); *H04L 2209/24* (2013.01); *H04L 2209/80* (2013.01); *H04W 12/72* (2021.01)

(58) Field of Classification Search
CPC ............... H04L 63/0442; H04L 63/061; H04L 63/0823; H04W 12/04; H04W 12/06
See application file for complete search history.

(56) References Cited

U.S. PATENT DOCUMENTS

| 6,263,437 | B1 | 7/2001 | Liao et al. |
| 8,467,769 | B2 | 6/2013 | Pison |

(Continued)

OTHER PUBLICATIONS

Non-Final Office Action received for U.S. Appl. No. 14/679,687 dated Mar. 24, 2016, 42 pages.
(Continued)

*Primary Examiner* — Chau Le
(74) *Attorney, Agent, or Firm* — Amin, Turocy & Watson, LLP

(57) ABSTRACT

A decentralized and distributed secure home subscriber server is provided. First data can be sent representing a first nonce string to a mobile device; and in response to receiving second data representing the first nonce string and a second nonce string, a communication channel can be established with the mobile device as a function of the first nonce string.

20 Claims, 13 Drawing Sheets

Related U.S. Application Data continuation of application No. 14/679,687, filed on Apr. 6, 2015, now Pat. No. 9,667,600.

(56) References Cited

U.S. PATENT DOCUMENTS

| | | | |
|---|---|---|---|
| 8,559,392 | B2 | 10/2013 | Ramankutty et al. |
| 8,839,382 | B2 | 9/2014 | Gupta |
| 8,848,665 | B2 | 9/2014 | Yano et al. |
| 2002/0161723 | A1 | 10/2002 | Asokan et al. |
| 2004/0243816 | A1* | 12/2004 | Hacigumus ....... G06F 16/24561 713/193 |
| 2007/0201700 | A1* | 8/2007 | Hacigumus ........... H04L 9/0891 380/277 |
| 2008/0162410 | A1 | 7/2008 | Montpetit et al. |
| 2009/0268911 | A1* | 10/2009 | Singh .................... H04L 9/0844 380/270 |
| 2010/0114964 | A1 | 5/2010 | Kerschbaum et al. |
| 2010/0199098 | A1 | 8/2010 | King |
| 2011/0010764 | A1 | 1/2011 | Lei et al. |
| 2012/0297473 | A1* | 11/2012 | Case ................... H04L 63/0853 726/10 |
| 2012/0311330 | A1 | 12/2012 | Zhang et al. |
| 2013/0010957 | A1 | 1/2013 | Yu |
| 2013/0012159 | A1* | 1/2013 | Lodeweyckx ........ H04W 8/183 455/406 |
| 2013/0084829 | A1 | 4/2013 | De Foy et al. |
| 2013/0104207 | A1 | 4/2013 | Kroeselberg et al. |
| 2013/0331063 | A1 | 12/2013 | Cormier et al. |
| 2014/0348130 | A1 | 11/2014 | Kaippallimalil et al. |
| 2015/0006895 | A1* | 1/2015 | Irvine ................... H04L 9/3242 713/171 |
| 2015/0007275 | A1 | 1/2015 | Hilbert et al. |
| 2015/0074396 | A1 | 3/2015 | Naslund et al. |
| 2015/0220718 | A1 | 8/2015 | Hong et al. |
| 2015/0229475 | A1* | 8/2015 | Benoit ................ H04L 63/0853 713/168 |
| 2016/0085955 | A1* | 3/2016 | Lerner .................. G06F 21/725 726/20 |

OTHER PUBLICATIONS

Final Office Action received for U.S. Appl. No. 14/679,687 dated Aug. 10, 2016, 40 pages.

Darlington III, "The Future of Bitcoin: Mapping the Global Adoption of World's Largest Cryptocurrency Through Benefit Analysis." (2014). Retrieved on Aug. 10, 2016, 23 pages.

Hurlburt et al., "Bitcoin: Benefit or Curse?" IT Professional 16.3 (2014): 10-15. Retrieved on Aug. 10, 2016, 6 pages.

Non-Final Office Action received for U.S. Appl. No. 15/497,264 dated Dec. 11, 2017, 25 pages.

Roger Piqueras Jover, "Security Attacks Against the Availability of LTE Mobility Networks: Overview and Research Directions", Published Jun. 2013, Retrieved From http://web2.research.att.com/expor1/sites/att_labs/techdocs/TD_101153.pdf (Year: 2013).

* cited by examiner

DECENTRALIZED AND DISTRIBUTED SECURE HOME SUBSCRIBER SERVER DEVICE

The present application is a continuation of, and claims priority to each of, U.S. patent application Ser. No. 15/497,264, filed Apr. 26, 2017, and entitled "DECENTRALIZED AND DISTRIBUTED SECURE HOME SUBSCRIBER SERVER DEVICE," which is a continuation of U.S. patent application Ser. No. 14/679,687 (now U.S. Pat. No. 9,667,600), filed Apr. 6, 2015, and entitled "DECENTRALIZED AND DISTRIBUTED SECURE HOME SUBSCRIBER SERVER DEVICE," the entire contents of which applications are hereby incorporated herein by reference.

TECHNICAL FIELD

Technical Field

The disclosed subject matter relates to the provision of a decentralized and distributed home subscriber server database device in an IP Multimedia Subsystem or IP Multimedia Core Network Subsystem (IMS) architectural framework for the delivery of IP multimedia services.

Background

Home subscriber server (HSS) devices are typically employed by mobile network operators (MNOs) as a master user database to support IMS network entities that handle calls. The home subscriber server generally contains subscription-related information (e.g., subscriber/user data associated with subscribers/users associated with a mobile network operator), performs authentication and authorization of the user/subscriber, and provides information about the user/subscriber's location and IP information. Home subscriber servers are similar to the Global System for Mobile (GSM) Communications' Home Location Register (HLR) and/or Authentication Centre (AuC).

DETAILED DESCRIPTION

Figure 1:
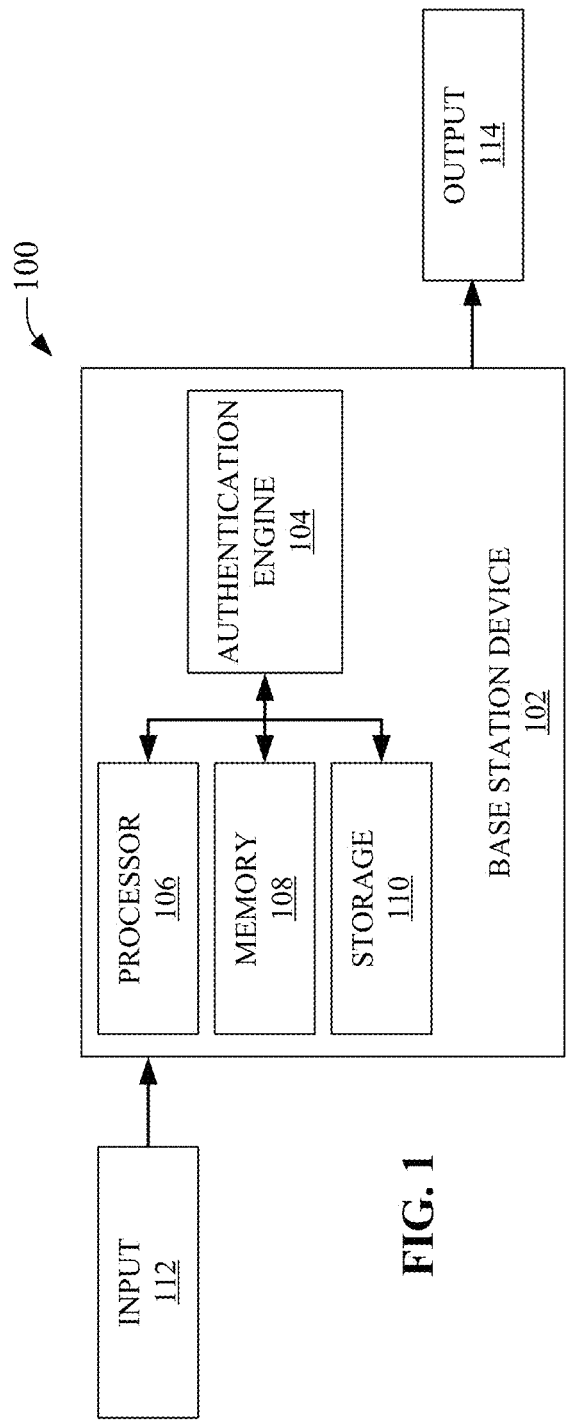
FIG. 1 is an illustration of a system for providing a decentralized and distributed secure home subscriber server/service, in accordance with aspects of the subject disclosure.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

The subject disclosure describes and provides systems and methods to implement home subscriber server functionality in a distributed fashion, The disclosed systems and methods, in accordance with an embodiment, provide a distributed architecture for authentication of mobile subscriber devices, mobile station devices, or end user devices to mobile network operator devices and vice-versa (e.g., mutual authentication) in the distributed fashion. In this way, a home subscriber server is not necessarily a centralized single point of failure that can be a target of a malicious distributed denial of service attack.

In order to facilitate the foregoing, the subject disclosure discloses and describes a system, apparatus, or device comprising: a processor, and a memory that stores executable instructions that, when executed by the processor, facilitate performance of operations. The operations can comprise sending first data representing a first nonce string to a mobile device, and in response to receiving second data representing the first nonce string and a second nonce string, establishing a communication channel with the mobile device as a function of the first nonce string. The first data can be encrypted by using a public key (e.g., first encryption key) associated with the mobile device, wherein the public key can be received from a database device of distributed database devices in response to sending an identifier associated with the mobile device to the distributed database devices. The identifier and the public key can be stored as a database tuple to the database device. Additionally, the second data can be encrypted using a public key associated with the device, such that a private key (e.g., second encryption key) associated with the device can be used to decrypt the second data. Further operations that can be performed by the system, device, or apparatus can include sending third data representing the second nonce string to the mobile device, wherein the third data can have been encrypted with the public key associated with the mobile device.

In accordance with a further embodiment, the subject disclosure describes a method, comprising a series of acts that can include: receiving first data representing a first nonce string; in response to receiving a database tuple comprising a cell identifier associated with a base station device and a public key associated with the base station device, sending second data representing the first nonce string and a second nonce string; and establishing a communication channel with the base station device in response to receiving third data comprising the second nonce string. The first data can be received in response to sending an international mobile subscriber identifier (IMSI) to the base station device.

Additional acts can include using a private key to decrypt the first data to obtain the first nonce string, wherein the private key is burned, indelibly persisted, or permanently stored, to an integrated circuit device associated with the system; using the public key associated with the base station device to encrypt the second data; and using the private key to decrypt the third data to obtain the second nonce string.

In accordance with a still further embodiment, the subject disclosure describes a computer readable storage device comprising instructions that, in response to execution, cause a computing system comprising a processor to perform operations. The operations can include: receiving first data representing an international mobile subscriber identifier (IMSI) string associated with an mobile station device; based on the international mobile subscriber identifier (IMSI) string, searching through a storage device to retrieve a first database tuple comprising the international mobile subscriber identifier (IMSI) string and a public key associated with the mobile station device; and sending second data representing the public key associated with the mobile station device to a base station device.

Further operations can include sending third data representing a second database tuple to the mobile station device, wherein the second database tuple comprises a cell identifier associated with the base station device and a public key associated with the base station device, the first data is received from the base station device, and the international mobile subscriber identifier (IMSI) string is associated with a subscriber identification module (SIM) card.

In accordance with one or more embodiment, the disclosed decentralized and distributed secure home subscriber server system can leverage the Bitcoin blockchain; the distributed database in the bitcoin infrastructure. Moreover, in accordance with additional and/or alternative embodiments, the decentralized and distributed secure home subscriber server system can employ a peer-to-peer network of nodes involved in the decentralized and distributed secure home subscriber server system to operate their own internal distributed block chain. Nonetheless, in cases where the decentralized and distributed secure home subscriber server system utilizes the bitcoin blockchain, advantage can be taken of the plethora of nodes contributing and maintaining the security of bitcoin transactions.

In the disclosed decentralized and distributed secure home subscriber server system, base station devices associated with a mobile network operator can form a public or internal Bitcoin peer-to-peer network. Within this peer to peer network each base station device can share a distributed database of transactions, the block chain. As with the Bitcoin operation, although a compromised network node could attempt to corrupt the distributed database, this would not be possible unless a majority of the nodes were compromised. Moreover, in the event of a node (e.g. base station device) being down or overwhelmed by an overloading attack, the disclosed distributed secure home subscriber server system operation would be unaltered and only mobile devices under the coverage of a victim base station device would be affected.

In order to enhance the resiliency and processing speed of an internal distributed secure home subscriber block chain, other network nodes can be added to the peer-to-peer network, though they would not necessarily execute the distributed secure home subscriber functionality.

The disclosed decentralized and distributed secure home subscriber architecture assumes a strong public-secret key encryption scheme using strong keys (e.g. 2048 bits). The distributed database—the block chain—contains transactions, as defined in the Namecoin framework, used to register {value, key} pairs and optional extra flags. For example, a given transaction in the distributed secure home subscriber server system distributed database registers the id of a node j and its corresponding public key $k^p_j$ as the pair $\{id_j, k^p_j\}$. These transactions can be originated by a mobile network operator device which can sign or encrypt the pair with one of its multiplicity/plurality of secret/private cryptographic keys. In turn one of the one or more public cryptographic keys associated with the mobile network operator device can be used to verify the pairing and validate that the pairing was created and inserted into the distributed database by the mobile network operator device.

Now with reference to the Figures. FIG. 1 illustrates a system 100 for providing a decentralized and distributed secure home subscriber server, in accordance with an embodiment. As illustrated, system 100 can comprise base station device 102 that, in addition to the depicted components/engines/devices, can additionally comprise, though not illustrated, multiple antenna groups, transmitter chains and/or receiver chains, which respectively can in turn comprise a plurality of components/devices associated with signal transmission and signal reception (e.g., processors, modulators, multiplexers, demodulators, demultiplexers, antennas, etc.), as will be appreciated by those skilled in the art.

Base station device 102 can communicate with one or more mobile device or access terminal; it is to be appreciated that base station device 102 can communicate with substantially any number of mobile devices or access terminals, wherein such mobile devices or access terminals can be, for example, cell phones, smart phones, laptops, handheld communication devices, handheld computing devices, satellite radios, global positioning systems, personal digital assistants (PDAs), and/or any other suitable device for communicating over a wireless communication system.

Base station device 102 can include authentication component/engine 104 that can be coupled to processor 106, memory 108, and storage 110. Authentication engine 104 can be in communication with processor 106 for facilitating operation of computer or machine executable instructions and/or components by authentication engine 104, memory 108 for storing data and/or the computer or machine executable instructions and/or components, and storage 110 for providing longer term storage of data and/or machine and/or computer executable instructions. Additionally, base station device 102 can also receive input 112 for use, manipulation, and/or transformation by authentication engine 104 to produce one or more useful, concrete, and tangible result and/or transform one or more articles to different states or things. Further, base station device 102 can also generate and output the useful, concrete, and tangible result and/or the transformed one or more articles produced by authentication engine 104 and output as output 114.

As will be observed from the foregoing, base station device 102 can be any type of mechanism, machine, device, facility, and/or instrument that includes a processor and/or is capable of effective and/or operative communication with a network topology. Mechanisms, machines, devices, facilities, and/or instruments that can comprise base station device 102 can include tablet computing devices, handheld devices, server class computing machines and/or databases, laptop computers, notebook computers, desktop computers, cell phones, smart phones, consumer appliances and/or instrumentation, industrial devices and/or components, hand-held devices, personal digital assistants, multimedia Internet enabled phones, multimedia players, and the like.

Base station device 102, prior to first use on a network topology controlled and/or operated by a mobile network operator, can be registered with the network topology (e.g., mobile network operator (MNO) topology, wireless carrier network, . . . ) and provisioned with a unique identifier, for example, a cell identifier associated with the network topology. Additionally, base station device 102 can also be provisioned with a private/secret cryptographic key that can be utilized by base station device 102 to decrypt messages received from various devices that may attempt to establish communication through and with base station device 102. The unique identifier and/or the private/secret cryptographic key can typically be persisted, for example, to memory 108 and/or storage 110, though this information can also be permanently persisted, irrevocably stored, or indelibly burned, to a specific read only integrated circuit device/chip.

Further, contemporaneously with providing base station device 102 with a unique identifier and a private/secret cryptographic key, the mobile network operator can also provision and persist, to a database device (e.g., storage 110) associated with a plurality of distributed database devices, the assigned unique identifier and a public cryptographic key that can be utilized by the many disparate and various devices that may wish to communicate with, and/or through, base station device 102 to encrypt messages from base station device 102. The unique identifier and the public cryptographic key stored to the database device can be retained or stored in the database as a database tuple. Moreover, when adding the retained and/or stored database tuple to the database device (e.g., storage 110) the mobile network operator device can store the database tuple as an expanded crypto-currency transaction, wherein the database device can store the pair of values that have been signed or encrypted with one of a plurality of private/secret cryptographic keys associated with the mobile network operator device. Thus, when verification is required to establish the legitimacy of either a base station device (e.g., base station device 102) or a mobile device attempting to communicate with or through the base station device, the database tuple that has been encrypted with one of a multiplicity of private/secret cryptographic keys associated with the mobile network operator device and persisted to the database device can be used to facilitate attestation of the base station device and/or the mobile device by using a corresponding public cryptographic key associated with the mobile network operator device.

It should be noted in the context of the unique identifier associated with base station device 102, that this unique identifier can be known to everyone in the network topology and therefore can be publicly shared. It should also be noted in connection with the public cryptographic keys and the secret/private cryptographic keys, as described in the subject application, that these keys are counterpart keys. Thus for instance, a message encrypted using the public cryptographic key can only be decrypted using the secret/private cryptographic key.

Authentication engine 104 in collaboration, for example, with processor 106, memory 108, and/or storage 110, and in accordance with an embodiment, can receive, as input 112, an identifier (e.g., international mobile subscriber identifier) associated with a mobile device. On receiving the identifier, authentication engine 104 can forward the identifier to a database device (e.g., storage 110) of a plurality of distributed database devices for verification. The database device can search through its records (e.g., a plurality of database tuples) and can thereafter return to authentication engine 104 a public cryptographic key associated with the identifier initially received from the mobile device. The database tuples persisted to the database device (or the plurality of distributed database devices) can comprise a pairing of an identifier associated with a device (in this instance, a mobile device) and a public cryptographic key associated with the identifier (e.g., the public cryptographic key associated with and used by the originating mobile device), wherein each pairing of an identifier associated with the device and the public cryptographic key associated with the identifier can have been encrypted or signed with a private/secret cryptographic key associated with a mobile network operator device. This signing or encrypting of the pairing of the identifier and its associated public cryptographic key with a private/secret key associated with the mobile network operator device can provide a verification mechanism to establish the authenticity of transactions between the multiplicity of disparate devices that can comprise a network controlled and/or maintained by a mobile network operator.

Authentication engine 104 on receiving, from the database device, the public cryptographic key associated with the mobile device can generate a nonce string (e.g., a random alphanumeric string of random and variable length), encrypt the generated nonce string using the public cryptographic key associated with the mobile device, and then send the encrypted nonce string to the mobile device as output 114.

The mobile device, on receiving the encrypted nonce string, can decrypt (e.g., using its associated counterpart private/secret cryptographic key) the encrypted nonce string to extract the nonce string that had previously been generated and encrypted by authentication engine 104 and sent by base station device 102 as output 114, and thereafter the mobile device can send the decrypted nonce string (e.g., the nonce string that was generated initially by authentication engine 104) back to base station device 102. Base station device 102, and in particular authentication engine 104, on receiving, as input 112, a returned valid nonce string can establish a secure communication channel with the mobile device.

Authentication engine 104, in accordance with a further embodiment, can also receive from a database device (e.g., storage 110) associated with a multitude of distributed database devices, a database tuple comprising the unique base station identifier and a public cryptographic key associated with both the unique base station identifier and the base station device. On receiving the database tuple from the database device, authentication engine 104, through facilities provided by base station device 102 can send/forward, as output 114, the database tuple to a mobile device. Typically, the action of sending/forwarding the database tuple to the mobile device can be initiated when a mobile device sends its identifier string (e.g. its international mobile subscriber identification/identifier (IMSI)) to initially establish communication with base station device 102. Authentication engine 104, through use of the wired and/or wireless transmission and/or reception facilities provided by base station device 102, can thereafter receive, from the mobile device, an encrypted nonce string, wherein the nonce string can have been generated by the mobile device using, for instance, a random alphanumeric string generator, and subsequently encrypted by the mobile device using the public cryptographic key associated with the base station device 102.

Upon receiving the encrypted nonce string from the mobile device, authentication engine 104 can decrypt the received encrypted nonce string by using a private/secret cryptographic key associated with base station device 102 to obtain the unencrypted nonce string that was generated by the mobile device. Authentication engine 104, unsuccessfully decrypting the received encrypted nonce string can send the decrypted nonce string back to the mobile device, whereupon a secure communication channel can be established between base station device 102 and the initiating mobile device.

In accordance with a further embodiment, and in accordance with a disclosed mutual authentication aspect, authentication engine 104 can receive an identifier string sent by a mobile device to base station device 102, wherein the identifier, for example, is an international mobile subscriber identification/identifier (IMSI). Authentication engine 104 on receiving the identifier from the mobile device can send/forward the received identifier string to a database device (e.g., storage 110) associated with a diverse grouping of distributed and disparate database devices. The database device can thereafter perform a database lookup and search through its records (e.g., database tuples) for a record that corresponds with the identifier. When the database device identifies the appropriate database tuple, the database device can return a public cryptographic key that is associated with the identifier string and that implicitly is associated with the initiating mobile device. Authentication engine 104, on receiving the public cryptographic key associated with the initiating mobile device can generate a first nonce string (e.g., using a random alphanumeric string generation unit/component), encrypt the generated first nonce string using the public cryptographic key that was returned by the database device, and send the encrypted first nonce string to the mobile device.

Authentication engine 104 can thereafter be placed, for example, in the state of stasis or hibernation and can await the return from the initiating mobile station device of an encrypted combined nonce string, wherein the encrypted combined nonce string can have been encrypted by the initiating mobile device using a public cryptographic key associated with base station device 102, and can comprise one of the first nonce string (e.g., the nonce string that was earlier generated, encrypted using the public cryptographic key associated with the mobile device, and distributed by base station device 102 to the mobile device) and/or a second nonce string that can have been generated by the initiating mobile device.

On receiving the encrypted combined nonce string from the initiating mobile device, authentication engine 104 can decrypt the received encrypted combined nonce string using a private cryptographic key associated with base station 102 to obtain the first nonce string (e.g., the nonce string that was initially generated by authentication engine 104) and/or the second nonce string (e.g., the nonce string can have been generated by the initiating or returning mobile device). Authentication engine 104, in response to obtaining the first nonce string can facilitate establishing a secure communication channel between base station device 102 and the initiating mobile device. Additionally, authentication engine 104 can encrypt the obtained second nonce string using a public cryptographic key associated with the initiating mobile device and then send the encrypted second nonce string back to the mobile device, wherein upon receiving and decrypting the encrypted second nonce string using its own private cryptographic key the mobile device can establish a secure communication channel to the base station device 102.

In the context of storage 110, storage 110 can be but one of a multitude of databases that can be associated with base station devices distributed throughout a coverage footprint provided by a network topology provided by a mobile network operator. Storage 110 in accordance with an embodiment therefore forms one aspect of a peer to peer distributed database that leverages the architecture of the transactional blockchain in Bitcoin and the database properties of Namecoin. In accordance with the architecture of the transactional blockchain in Bitcoin and the database properties of Namecoin, storage 110 (e.g., the distributed database aspect) can store value pairs {value, key} as well as optional extra flags. For example, storage 110 can register as a value pair an identifier associated with a mobile device or base station device together with a corresponding public key associated with the mobile device or base station device. The value pair can thereafter be signed or encrypted using one of many private/secret cryptographic keys associated with a mobile network operator device. The encrypted value pair (e.g., encrypted using one of the many private/secret cryptographic keys associated with the mobile network operator device) can be persisted to storage 110. Further, since it is the mobile network operator device that encrypts or signs the value pair using one of its many private/secret cryptographic keys, the mobile network operator device must be the device that initiates, facilitates, and/or effectuates persistence of the value pair to storage 110.

Figure 2:
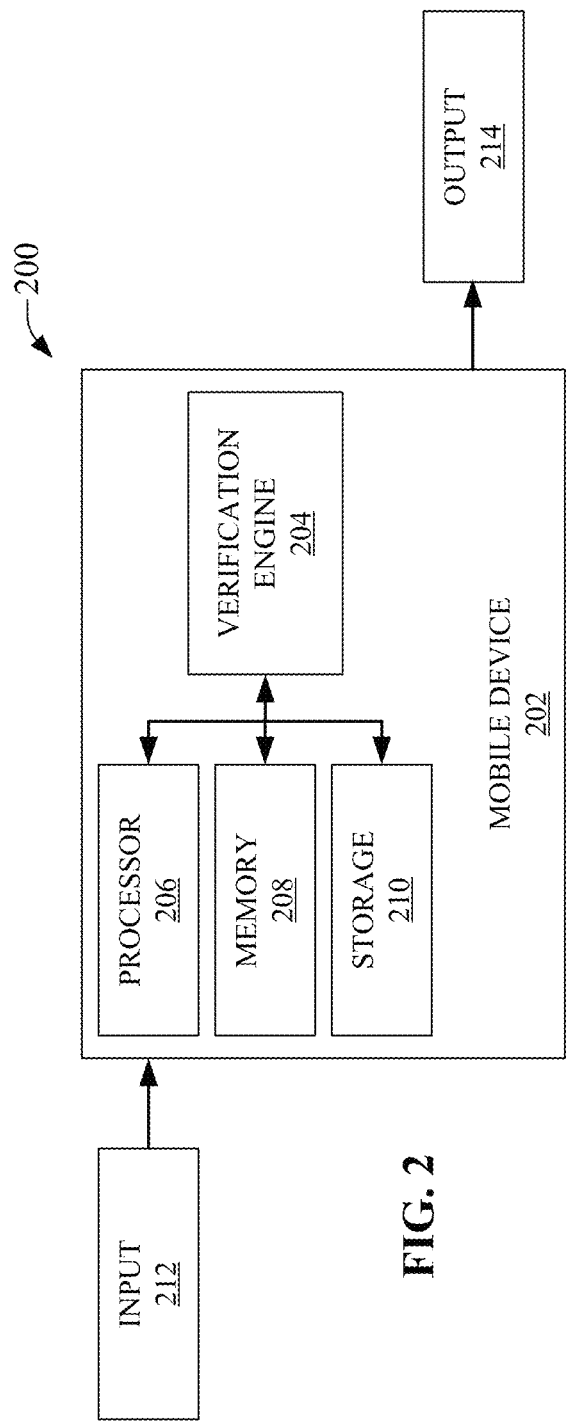
FIG. 2 is a further depiction of a system for providing a decentralized and distributed secure home subscriber server/service, in accordance with aspects of the subject disclosure.

FIG. 2 provides further illustration of a system 200 for providing a decentralized and distributed secure home subscriber server, in accordance with an additional embodiment. System 200 can comprise mobile device 202 that, in addition to the depicted components/engines/devices can also comprise, though not illustrated, multiple antennas, transmitter and/or receiver chains, wherein the transmitter chains and/or receiver chains can in turn comprise a plurality of components/devices associated with signal transmission and/or signal reception (e.g., processors, modulators, multiplexers, demodulators, demultiplexers, antennas, and the like), as will be appreciated by those skilled in the art.

As will be appreciated by those skilled in the art, mobile device 202 can be any type of mechanism, machine, device, facility, and/or instrument that includes a processor and/or is capable of effective and/or operative communication with a network topology. Illustrative mechanisms, machines, devices, facilities, and/or instruments of execution that can comprise mobile device 202 can include tablet computing devices, handheld devices, server class computing machines and/or databases, laptop computers, notebook computers, desktop computers, cell phones, smart phones, consumer appliances and/or instrumentation, industrial devices and/or components, hand-held devices, personal digital assistants, multimedia Internet enabled phones, multimedia players, and the like.

Mobile device 202 can include verification engine 204 that can be coupled to processor 206, memory 208, and storage 210. Verification engine 204 can be in communication with processor 206 for facilitating operation of computer or machine executable instructions and/or components by verification engine 204, memory 208 for storing data and/or the computer or machine executable instructions and/or components, and storage 210 for providing longer term storage of data and/or machine and/or computer executable instructions. Additionally, mobile device 202 can also receive input 212 for use, manipulation, and/or transformation by verification engine 204 to produce one or more useful, concrete, and tangible result and/or transform one or more articles to different states or things. Further, mobile device 202 can also generate and output the useful, concrete, and tangible results and/or the transformed one or more articles produced by verification engine 204 and output as output 214.

Mobile device 202, prior to first use on a network topology controlled and/or operated by a mobile network operator (MNO), can be registered with the network topology and provisioned with a subscriber identification module (SIM) card. The subscriber identification module card can include information such as a unique identifier (e.g., international mobile subscriber identification/identifier (IMSI)) and a secret/private cryptographic key to be utilized or employed by mobile device 202 when mobile device 202 receives messages that have been encrypted by another entity (e.g., base station device 102) using a counterpart public cryptographic key that has been associated with mobile device 202, and that corresponds with the persisted secret/private cryptographic key. Additionally, the mobile network operator can also persist the unique identifier (e.g., IMSI) to a database device associated with a varied and network distributed cluster of database devices, wherein the unique identifier associated with mobile device 202 (or more particularly, the IMSI associated with the subscriber identification module card used by mobile device 202) can be paired with a public cryptographic key and stored as a database tuple to a database device (e.g., storage 110 associated with base station device 102). The stored database tuple that pairs the unique identifier and the public cryptographic key associated with the mobile device 202 can be signed or encrypted with one of a plurality of secret/private cryptographic keys associated with a mobile network operator device. The pairing of the identifier and its associated public cryptographic key signed/encrypted with a private/secret key associated with the mobile network operator device can thereafter be used as a verification mechanism to establish the authenticity of transactions conducted within the coverage area afforded by the mobile network operator, wherein one of a plurality of counterpart public cryptographic keys associated with the mobile network operator device can be used to facilitate the verification.

In parallel with registering and persisting the pairing of the international mobile subscriber identification/identifier associated with the subscriber identification module and the public cryptographic key to the database device and/or to the plurality of network distributed database device, the international mobile subscriber identification/identifier together with a private/secret cryptographic key can be burned, indelibly stored, permanently persisted to a write once read only integrated circuit device that can be associated with mobile device 202. As noted above in the context of the public cryptographic key and the secret/private cryptographic key associated with base station device 102, the public cryptographic key and the secret/private cryptographic key associated with mobile device 202 can be a counterpart pair of keys, wherein the public cryptographic key can be employed by network entities to encrypt messages from mobile device 202, and the private/secret cryptographic key can be utilized by mobile device 202 to decrypt messages that have been encrypted using the public cryptographic key.

Additionally, mobile device 202 can also store a public cryptographic key associated with the mobile network operator. The public cryptographic key associated with the mobile network operator, as noted above, is typically needed a priori so that mobile device 202 can verify transactions (e.g., database tuples) in a database device associated with a plurality of diversely located distributed database devices (for convenience and ease of exposition, storage 110 associated with base station device 102), since the authentication process can occur prior to mobile device 202 obtaining access to the network topology (e.g., before mobile device 202 is able to connect to the Internet and retrieve the publicly known and/or public cryptographic key associated with the mobile network operator).

When mobile device 202 first enters a cell (or cell sector) controlled or managed by a base station device, mobile device 202, through facilities provided by verification engine 204, can send an identifier (e.g., the mobile device's international mobile subscriber identifier/identification) to the base station device (e.g., base station device 102). Upon receiving this identifier from mobile device 202, base station device 102 can forward this identifier to an associated database device (e.g., storage 110) associated with a grouping of diversely located distributed database devices for verification. Verification of the identifier received from mobile device 202 can take the form of base station device 102 ensuring that a database tuple stored to the associated database device and comprising the received identifier has previously been encrypted using a private/secret cryptographic key associated with a mobile network operator device. Once base station device 102 has verified that the identifier is valid and is associated with a public cryptographic key associated with mobile device 202, base station device 102 can generate a nonce string, encrypt the nonce string, and send/forward an encrypted nonce string to mobile device 202. The encrypted nonce string can be encrypted using the public cryptographic key associated with mobile device 202 (e.g., the public cryptographic key retrieved by base station 102 during the verification phase). Mobile device 202, on receiving the encrypted nonce string, using its previously stored private/secret cryptographic key, can decrypt the received and encrypted nonce string to extract the nonce string that was generated, encrypted, and forwarded by base station device 102. As noted earlier, a nonce string can be a random alphanumeric string of a variable and random length.

Once mobile device 202, through facilities provided by verification engine 204, has decrypted the encrypted nonce string received from base station device 102, it can send the now decrypted nonce string back to base station device 102 and thereafter establish a secure communication channel with base station device 102.

In a further embodiment, mobile device 202, once again through facilities provided by verification engine 204 can, in accordance with an aspect, receive from a base station device (e.g. base station device 102) a database tuple that can comprise an identification string associated with the base station device and a public cryptographic key that can also be associated with the base station device. Mobile device 202, and more particularly verification engine 204, in response to receiving such a database tuple can confirm the validity of origination of the database tuple by ensuring that the private/secret cryptographic key associated with a mobile network operator device was employed to encrypt the database tuple. Verification engine 204 thereafter can respond to receiving the database tuple by: generating a nonce string; encrypting the generated nonce string using the received public cryptographic key associated with the base station device; and sending/forwarding the encrypted nonce string back to the base station device. Thereafter, mobile device 202 can establish a secure communication channel/link between itself and base station device 102.

In accordance with yet a further embodiment, and in accordance with a disclosed mutual authentication aspect, verification engine 204 associated with mobile device 202, in response to sending an identifier (e.g., international mobile subscriber identifier/identification (IMSI)), can receive an encrypted first nonce string, wherein the first nonce string is generated by a base station device (e.g., base station device 102) and encrypted by the base station device using a public cryptographic key associated with mobile device 202. On receiving the encrypted first nonce string, verification engine 204 can decrypt the encrypted first nonce string using a private/secret cryptographic key to extract the first nonce string. The private/secret cryptographic key used by verification engine 204 is a counterpart/corresponding cryptographic key to the public cryptographic key that was utilized by base station device 102 to encrypt the first nonce string.

Additionally, in accordance with the disclosed mutual authentication aspect, verification engine 204 can, in response to receiving a database tuple comprising an identifier associated with a base station device and a public key (e.g., first encryption key) associated with the base station device, can generate a second nonce string, combine the first nonce string (received from the base station device) with the generated second nonce string to form a combined nonce string (e.g., the combined nonce string can be the first nonce string and/or the second nonce string), encrypt the combined nonce string using a public key associated with the base station device, and thereafter send the encrypted combined nonce string to the base station device.

Further, verification engine 204, in response to receiving, from the base station device, an encrypted second nonce string (e.g., the second nonce string previously generated, combined, and the combination encrypted by verification engine 204 and earlier sent to the base station) can decrypt the received encrypted second nonce string using the private/secret cryptographic key of mobile device 202 to obtain the decrypted second nonce string. It should be noted that the encrypted second nonce string can have been encrypted by the returning base station device using the public key of the mobile device 204. Verification engine 204 can thereafter facilitate, as a function of receiving and successfully decrypting the second nonce string, establishing a secure communication channel/link between the mobile station device 202 and the base station device.

In view of the example system(s) described above, example method(s) that can be implemented in accordance with the disclosed subject matter can be better appreciated with reference to flowcharts in FIGS. 3-10. For purposes of simplicity of explanation, example methods disclosed herein are presented and described as a series of acts; however, it is to be understood and appreciated that the disclosure is not limited by the order of acts, as some acts may occur in different orders and/or concurrently with other acts from that shown and described herein. For example, one or more example methods disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a described example method in accordance with the subject specification. Further yet, two or more of the disclosed example methods can be implemented in combination with each other, to accomplish one or more aspects herein described. It should be further appreciated that the example methods disclosed throughout the subject specification are capable of being stored on an article of manufacture (e.g., a computer-readable medium) to allow transporting and transferring such methods to computers for execution, and thus implementation, by a processor or for storage in a memory.

Figure 3:
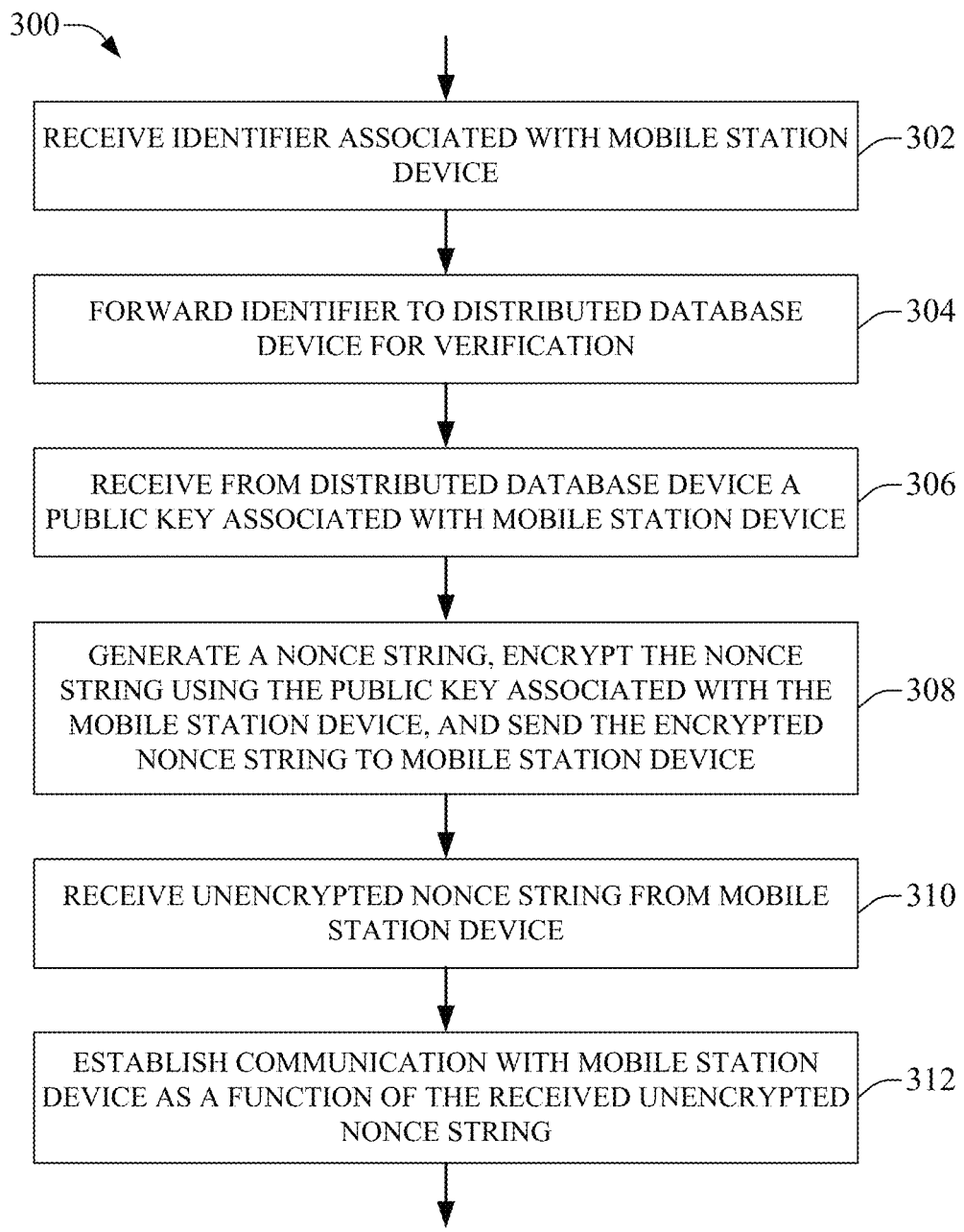
FIG. 3 provides illustration of a flow chart or method for providing a decentralized and distributed secure home subscriber server/service from the perspective of a base station device in accordance with aspects of the subject disclosure.

FIG. 3 illustrates a method 300 a decentralized and distributed secure home subscriber server in accordance with an embodiment. Method 300 can be implemented on a base station device, such as base station device 102, and effectuated by authentication engine 104. Method 300 can commence at 302 where base station device 102 can receive, as input 112, an identifier (e.g., an international mobile subscriber identification/identifier (IMSI)) from a mobile device (e.g., mobile device 202). At act 304 base station device 102 can forward the received identifier to a database device (e.g., storage 110) for verification. At 306 base station device 102 can receive from the database a public cryptographic key associated with the forwarded identifier, which in turn will be the public cryptographic key associated with mobile device 202. Additionally, at 306 base station device 102 can facilitate a verification of the received public cryptographic key associated with the forwarded identifier by using one of a plurality of public cryptographic keys associated with a mobile network operator device, since the pairing of the public cryptographic key associated with the forwarded identifier should have been stored to a distributed database device (e.g. storage 110) by a mobile network operator device subsequent to the mobile network operator device having encrypted the pairing of the public cryptographic key and the associated identifier with a counterpart one of the plurality of private/secret cryptographic keys associated with the mobile network operator device. On receiving the public cryptographic key associated with a mobile device, base station device 102, at act 308, can generate a nonce string, encrypt the generated nonce string using the recently acquired public cryptographic key associated with a mobile device, and thereafter send the generated and encrypted nonce string to the mobile device. At act 310, base station device 102 can receive a decrypted nonce string from the mobile device. It should be noted, that the decrypted nonce string returned from the mobile device will typically be the nonce string that was previously generated an encrypted by base station device 102. Based at least in part on receipt of the decrypted nonce string from the mobile device, base station device 102 can establish a secure communication session with the mobile device.

Figure 4:
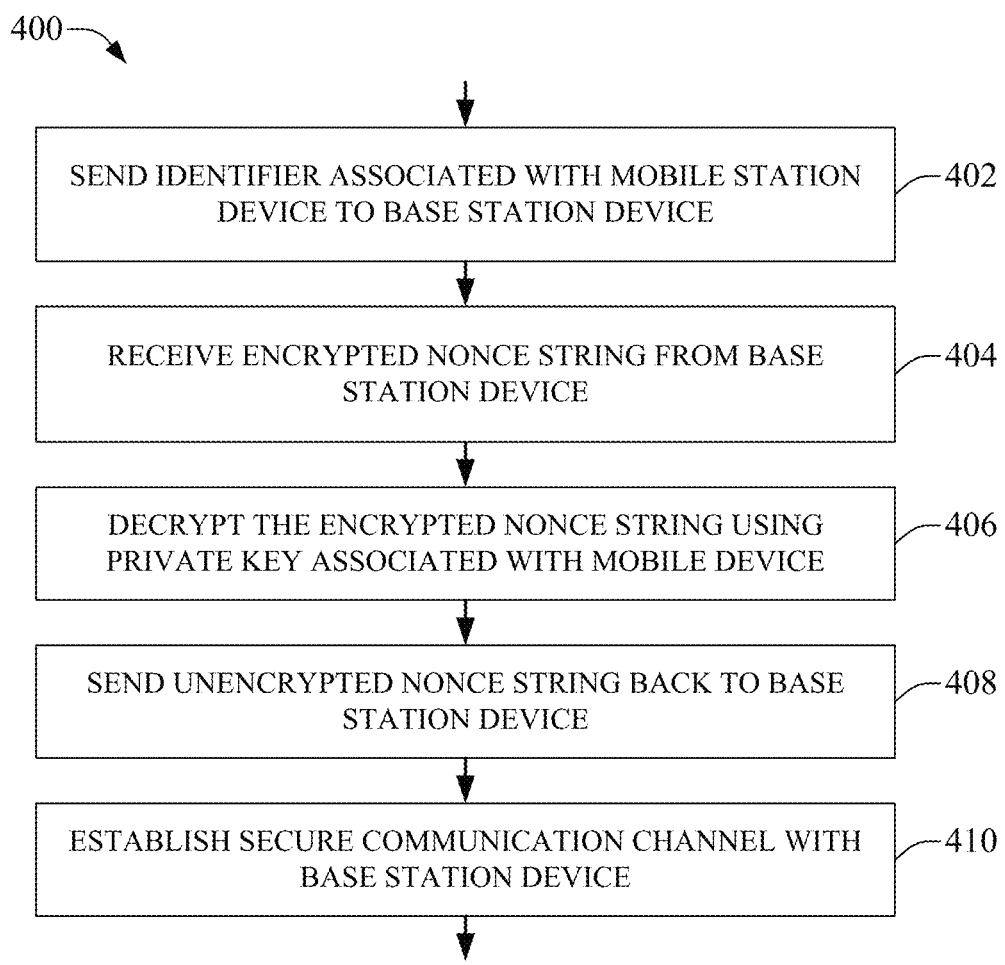
FIG. 4 provides another illustration of a flow chart or method for providing a decentralized and distributed secure home subscriber server/service from the perspective of a mobile device in accordance with aspects of the subject disclosure.

FIG. 4 illustrates a further method 400 for providing a decentralized and distributed secure home subscriber server/service in accordance with an embodiment. Method 400 can be implemented by a mobile device (e.g., mobile device 202), and more particularly effectuated by verification engine 204. Method 400 can therefore commence at 402 where mobile device 202 can send, as output 214, an identifier (e.g., international mobile subscriber identification/identifier (IMSI)) to a base station device (e.g. base station device 102). In response to sending the identifier to the base station device, mobile device 202, at act 404, can receive, as input 212, an encrypted nonce string that can have been generated and encrypted (e.g. using a public cryptographic key associated with mobile device 202) by base station device 102. On receiving the encrypted nonce string as input 212 from the base station device, mobile device 202, at act 406, can decrypt the received encrypted nonce string to extract the nonce string by using a private/secret cryptographic key associated with the mobile device 202. Mobile device 202 can thereafter send the now decrypted nonce string back to the base station device at 408, and thereafter establish secure communication channels/links with the base station device at act 410.

Figure 5:
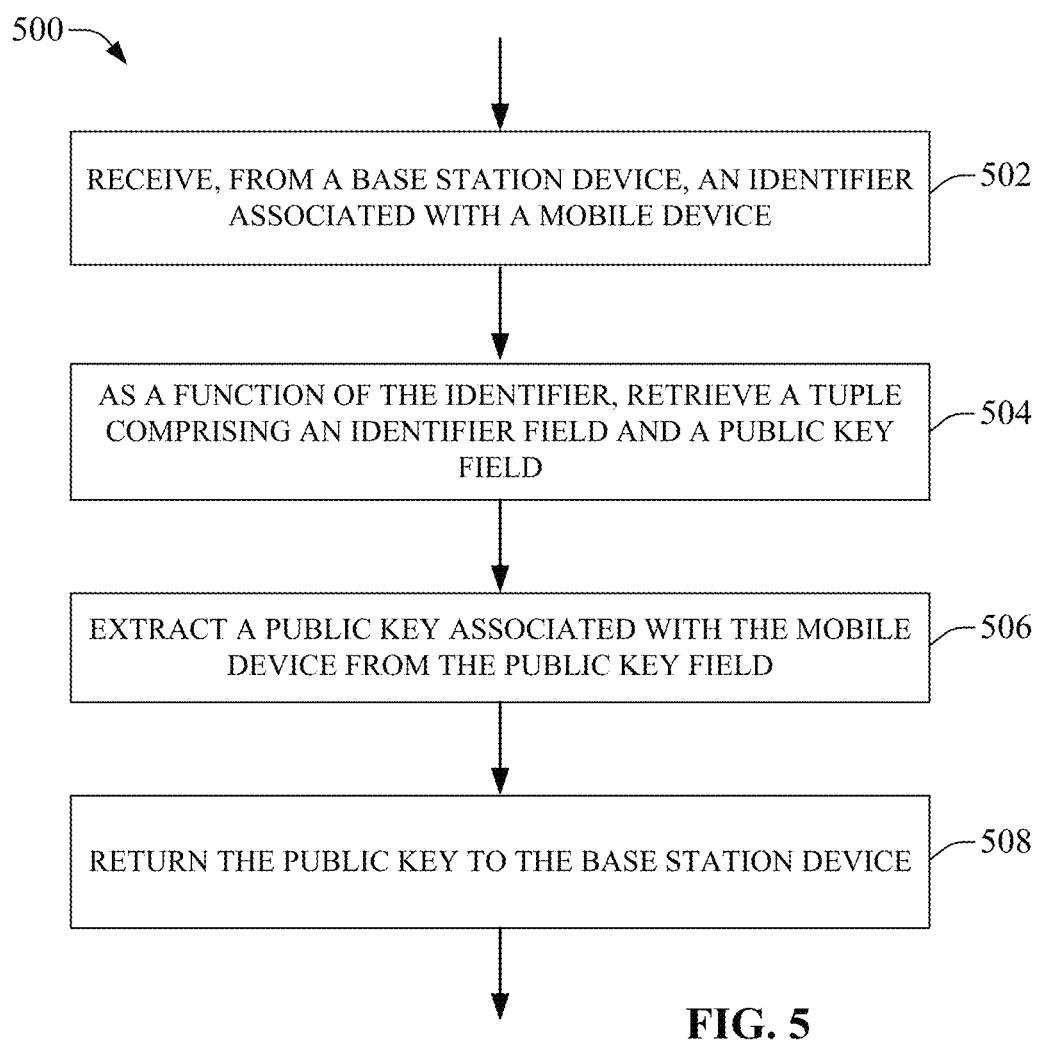
FIG. 5 illustrates another flow chart or method for providing a decentralized and distributed secure home subscriber server/service from the perspective of a database device of distributed database devices in accordance with aspects of the subject disclosure.

FIG. 5 illustrates another method 500 for providing a decentralized and distributed secure home subscriber server in accordance with another embodiment. Method 500 can be facilitated and/or effectuated by a distributed database server device. In accordance with this aspect, method 500 can commence at act 502, whereupon a distributed database server device can receive, from a base station device (e.g., base station device 102) an identifier associated with a mobile device (e.g. mobile device 202). The distributed database server device on receipt of the identifier (e.g., international mobile subscriber identification/identifier) can retrieve, from an associated database device (e.g., storage 110 associated with base station device 102), a database tuple that can comprise an identifier field and a public cryptographic key field, wherein the identifier field can contain or comprise the international mobile subscriber identification/identifier associated with the mobile device and the public cryptographic key field can contain or comprise a public cryptographic key that is associated with the international mobile subscriber identification/identifier and by association with the mobile device. The distributed database server device, at act 506, can thereafter extract the public cryptographic key from the public cryptographic key field, and at act 508, return the public cryptographic key associated with the identifier and further associated with a mobile device to the base station device 102.

Figure 6:
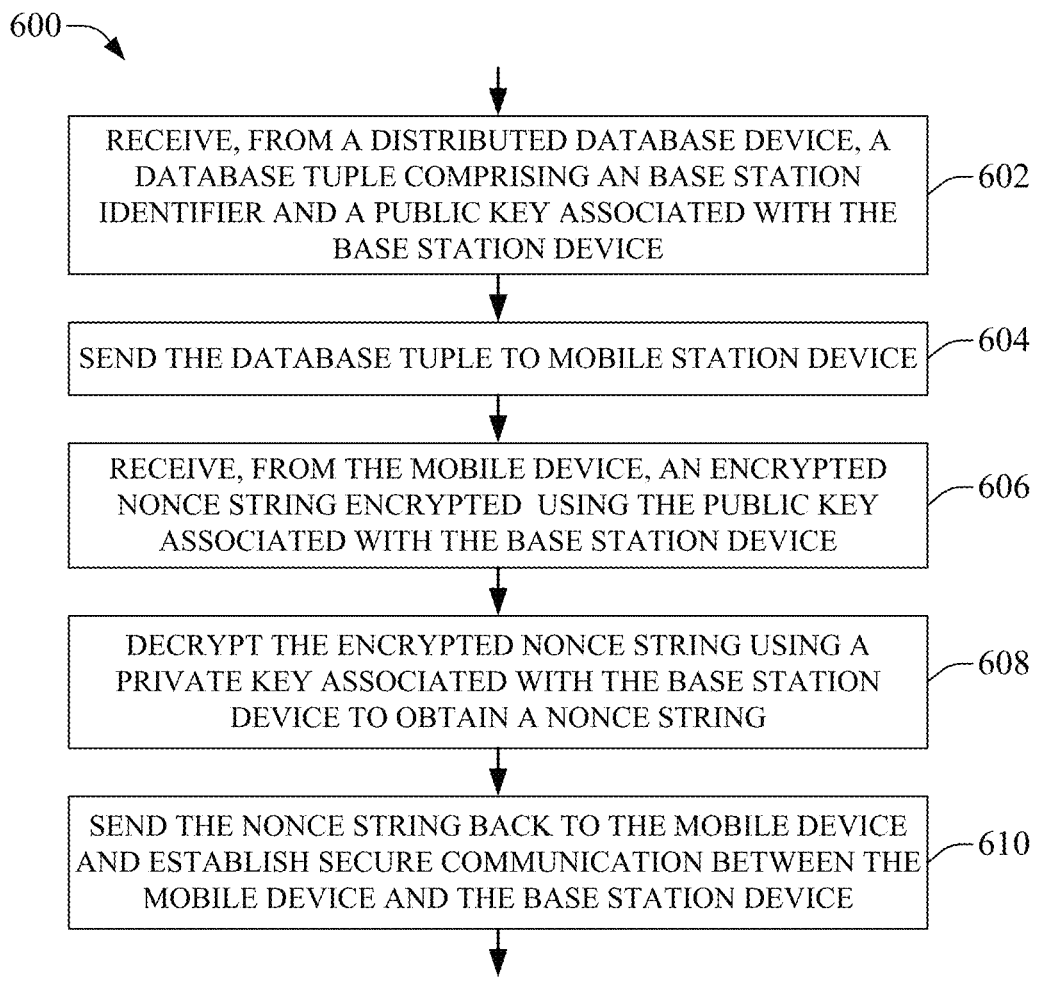
FIG. 6 illustrates another flow chart or method for providing a decentralized and distributed secure home subscriber server/service from the perspective of a base station device in accordance with aspects of the subject disclosure

FIG. 6 illustrates an additional method 600 for providing a decentralized and distributed secure home subscriber server/service in accordance with a further embodiment. Method 600 can be implemented and effectuated on base station device 102, and in particular can be implemented and effectuated by authentication engine 104. Method 600 can commence at act 602 where authentication engine 104 can receive, from a distributed database device, a database tuple that can comprise a base station device identifier (e.g., as noted above, the cell identifier associated with the base station device by a mobile network operator) and a public cryptographic key that has also been associated, by the mobile network operator, with the base station device identifier, and thus the base station device. At act 604 authentication engine 104 can send the database tuple to a mobile device. At act 606, authentication engine 104 can receive, from the mobile device, an encrypted nonce string. The nonce string is typically generated by the mobile device, encrypted by the mobile device using the public cryptographic key of the base station device, and thereafter dispatched by the mobile device back to the base station device. At act 608, authentication engine 104 can decrypt the received encrypted nonce string using a private cryptographic key associated with the base station device to obtain an decrypted nonce string. At act 610, authentication engine 104 can send the now decrypted nonce string back to the mobile device, whereupon on receipt of the decrypted nonce string the mobile device and the base station device can establish a secure communication channel between them.

Figure 7:
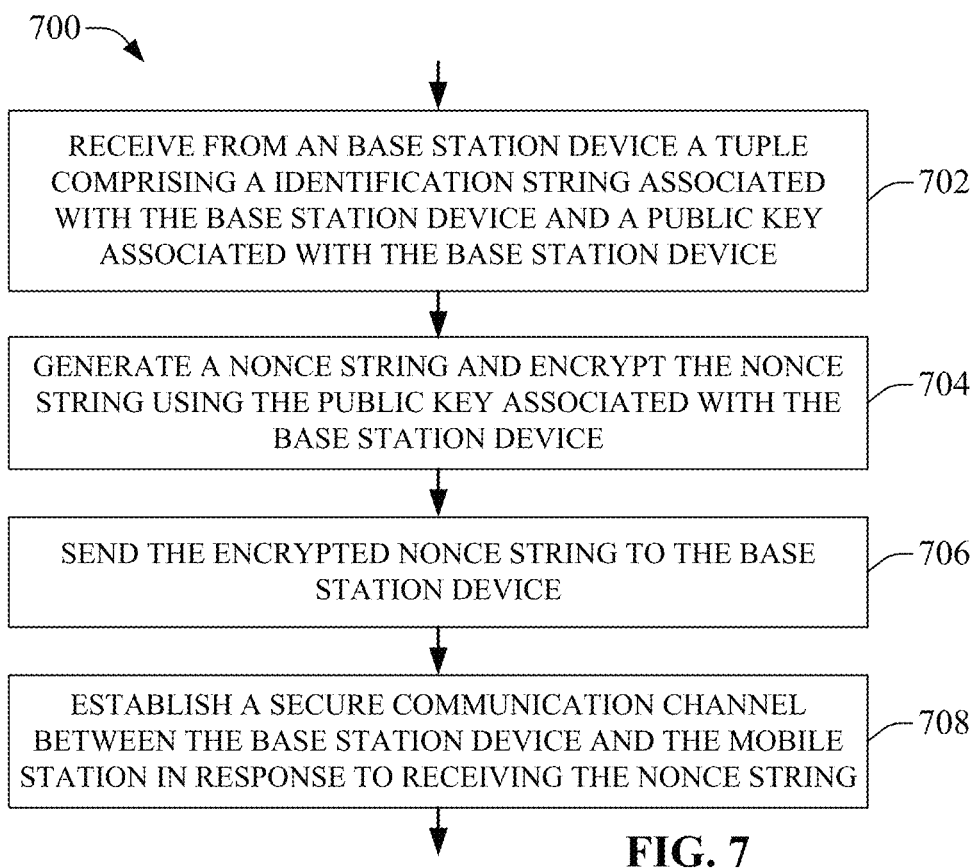
FIG. 7 illustrates further flow chart or method for providing a decentralized and distributed secure home subscriber server/service from the perspective of a mobile station device in accordance with aspects of the subject disclosure FIG. 8 provides another illustration of a flow chart or method for providing a decentralized and distributed secure home subscriber server/service from the perspective of a base station device in accordance with aspects of the subject disclosure

FIG. 7 illustrates a further method 700 for providing or supplying a decentralized and distributed secure home subscriber server/service in accordance with further disclosed embodiments. Method 700 can be implemented by mobile device 202, and in particular by verification engine 204. Method 700 can commence at act 702 where verification engine 204 can receive from a base station device (e.g., base station device 102) a database tuple comprising an identification string associated with the base station device (e.g. a unique cell identifier that can have been assigned to the base station device by a mobile network operator during setup of the base station device) and a public cryptographic key that can also be associated and can have been assigned by the mobile network operator to the base station device. At act 704 verification engine 204, in response to having received the database tuple, can generate a nonce string and thereafter can encrypt the generated nonce string using received the public cryptographic key associated with the base station device. At act 706 verification engine 204 can send the encrypted nonce string to the base station device. Subsequent to sending the encrypted nonce string to the base station device, at act 708 verification engine 204 can establish, or facilitate the establishment, a secure communication channel between the base station device and the mobile device should the base station device respond with a valid decrypted nonce string.

Figure 8:
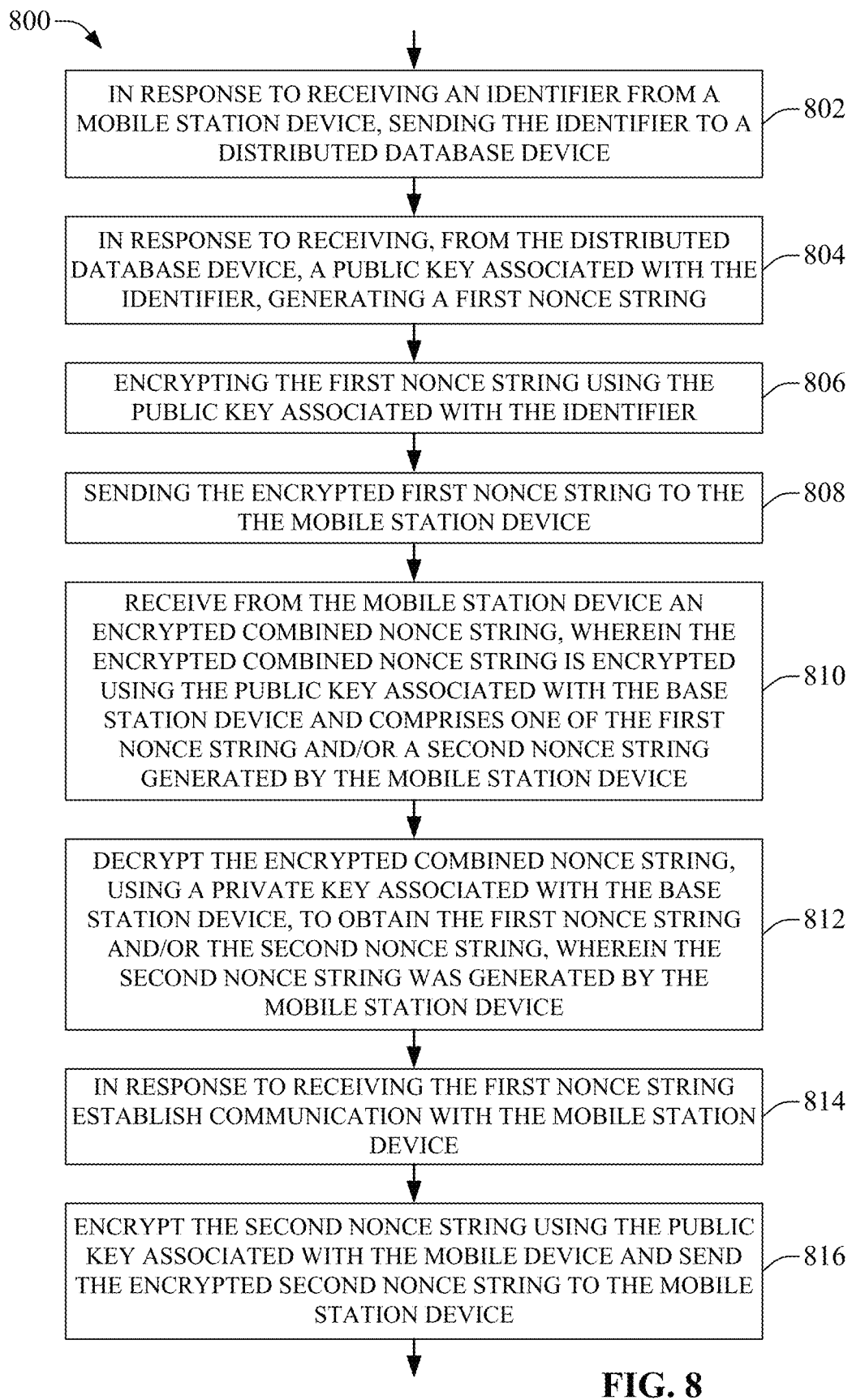

FIG. 8 illustrates another method 800 for providing or supplying a decentralized and distributed secure home subscriber network in accordance with a further embodiment. In this instance, method 800 describes a mutual authentication aspect that can be implemented on, or by, base station device 102, and in particular can be effectuated by authentication engine 104. Method 800 can commence at 802, where, in response to receiving an identifier from a mobile device (e.g. international mobile subscriber identifier/identification (IMSI) string), authentication engine 104 can send/forward the received identifier to an associated distributed database device (e.g., storage 110). At 804 authentication engine 104, in response to receiving, from the associated distributed database device a public cryptographic key associated with the identifier, can generate a first nonce string. Once authentication engine 104 has generated the first nonce string, authentication engine 104 can, at 806, encrypt the first nonce string by using the public cryptographic key associated with the identifier, and in turn associated with the mobile device. On completion of encrypting the first nonce string, at 806, authentication engine 104 can send the encrypted first nonce string to the mobile device (e.g., the mobile device associated with the identifier that initiated sending its identifier at 802), at 808. At 810 authentication engine 104 can receive from the mobile device an encrypted combined nonce string, wherein the encrypted combined nonce string can comprise one or both of the first nonce string generated earlier by authentication engine 104 and/or a second nonce string that has been generated and by the mobile device. The encrypted combined nonce string received from the mobile device will typically have been encrypted by the mobile device using the public cryptographic key associated with the base station device 102. Authentication engine 104, on receiving the encrypted combined nonce string from the mobile device, at act 812, can decrypt the encrypted combined nonce string by using the private cryptographic key associated with the base station device. The result of the decryption of the encrypted combined nonce string is the first nonce string and/or the second nonce string, wherein the first nonce string was generated by authentication engine 104 and second nonce string was generated by the mobile device (e.g., by verification engine 204). Authentication engine 104 at 814, in response to receiving the first nonce string appropriately and validly decrypted by facilities provided on mobile device, can effectuate and facilitate establishing a communication channel with the mobile device. At 816, authentication engine 104 can also encrypt the second nonce string using the public cryptographic key associated with a mobile device and thereafter send the encrypted second nonce string to the mobile device for its use in establishing the communication channel with the base station device.

Figure 9:
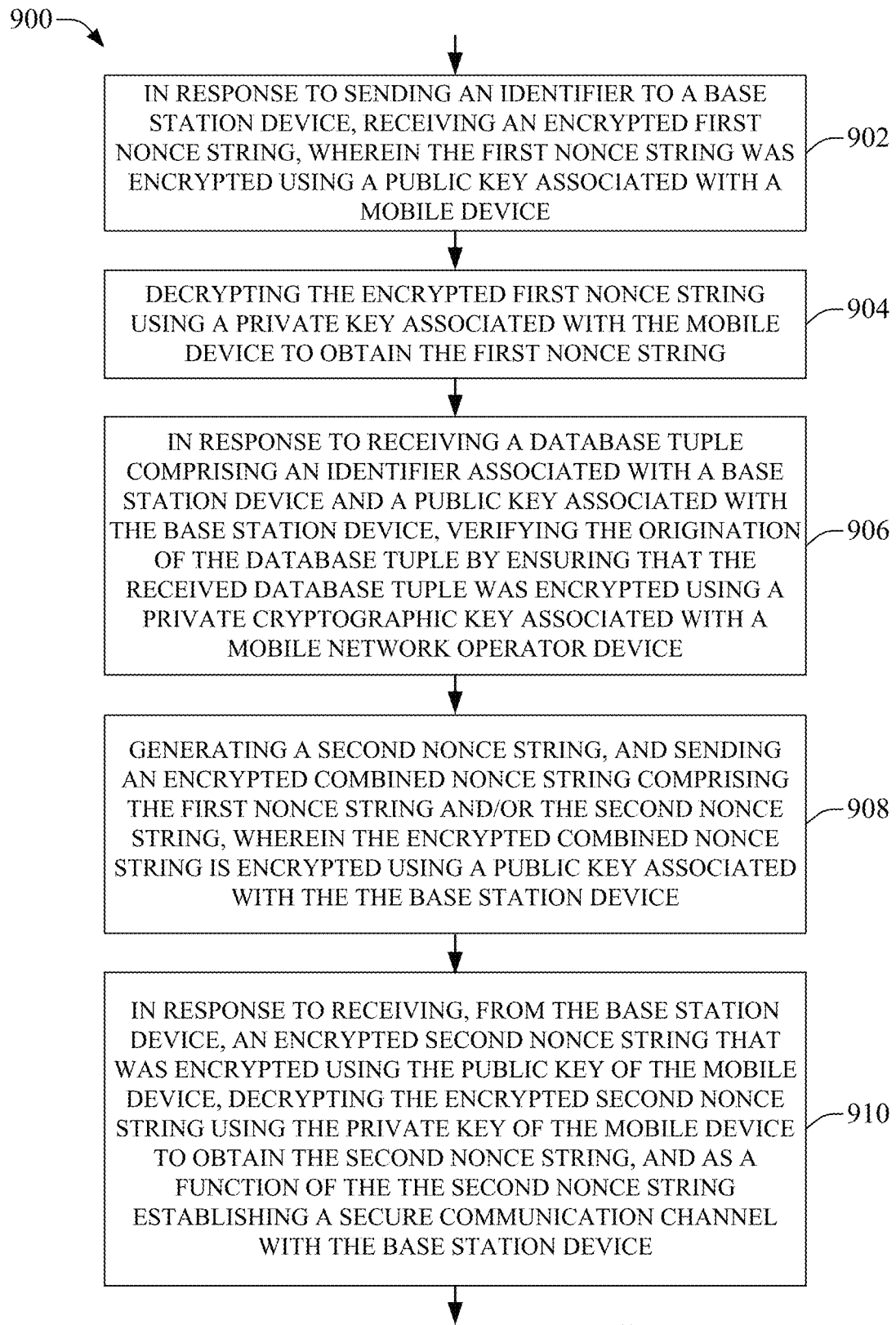
FIG. 9 illustrates another flow chart or method for providing a decentralized and distributed secure home subscriber server/service from the perspective of a mobile device in accordance with aspects of the subject disclosure

FIG. 9 illustrates another method 900 for providing or supplying a decentralized and/or distributed secure home subscriber server/service in accordance with an embodiment. Method 900, in accordance with an aspect, can be implemented by mobile device 202, and in particular by verification engine 204. In this instance, method 900 describes a mutual authentication aspect that can be implemented on, or by, mobile device 202, and in particular effectuated by verification engine 204. In accordance with this aspect, verification engine 204, in response to sending an identifier to a base station device (e.g., base station device 102), can receive, at 902, an encrypted first nonce string, wherein the first nonce string can have been encrypted by the base station device using a public cryptographic key associated with mobile device 202. At 904, verification engine 204 can decrypt the received encrypted first nonce string using a private cryptographic key associated with the mobile device. The result of the decryption of the encrypted first nonce string is the first nonce string.

At 906, verification engine 204, in response to receiving a database tuple comprising an identifier associated with a base station device and a public cryptographic key associated with the base station device, can verify bona fides of the received database tuple by ensuring that the received database tuple had previously been encrypted with a private/secret cryptographic key associated with a mobile network operator device (e.g., verification engine 204 can employ a previously persisted public cryptographic key associated with the mobile network operator device to decrypt the received database tuple that had previously been encrypted with the private/secret cryptographic key associated with the mobile network operator device).

At 908 verification engine 204 can generate a second nonce string and can send an encrypted combined nonce string comprising the first nonce string (e.g., the result of the decryption of the encrypted first nonce string) and/or the recently generated second nonce string, wherein the combined nonce string is encrypted using a public cryptographic key associated with the base station device to form the encrypted combined nonce string.

At 910, verification engine 204, in response to receiving, from the base station device, an encrypted second nonce string that has now been encrypted by the base station device using the public cryptographic key associated with the mobile device, can decrypt the encrypted second nonce string using the private cryptographic key of the mobile device to obtain the unencrypted second nonce string, and as a function of, in response or, or base on receiving a valid unencrypted second nonce string, establishing a secure communication channel between the mobile device and the base station device.

Figure 10:
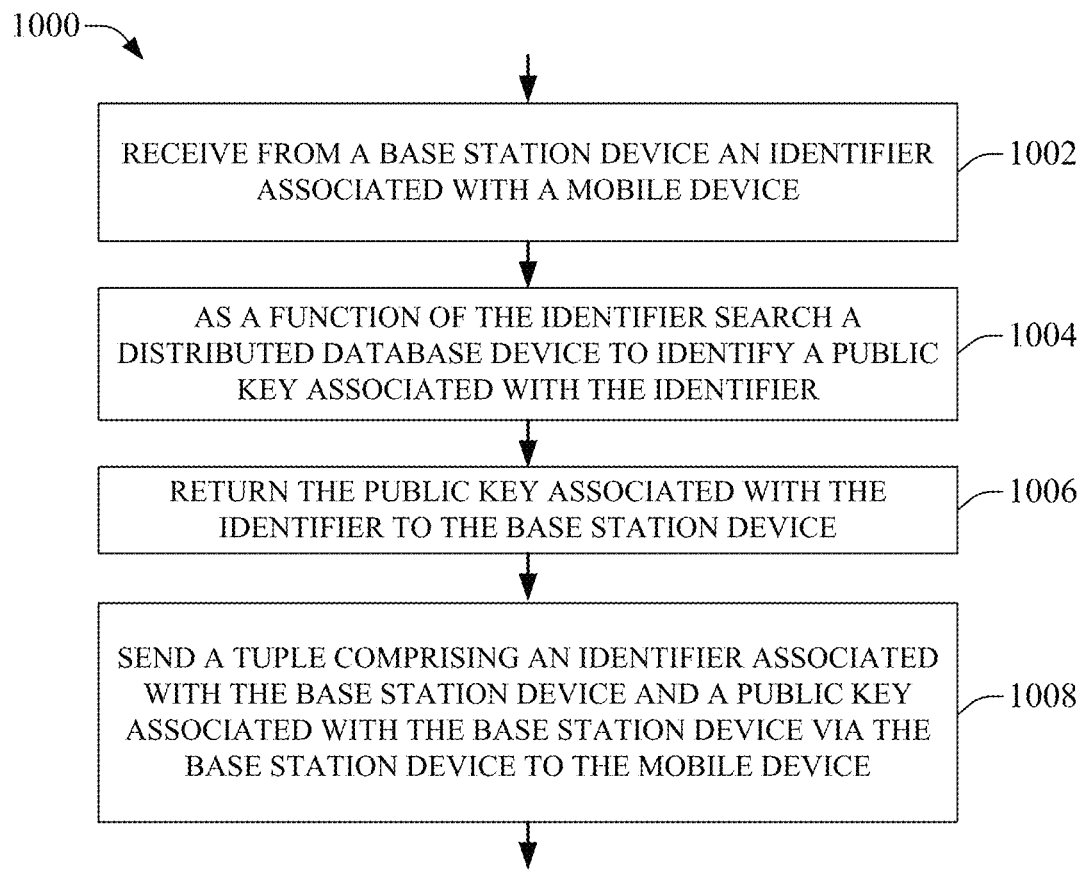
FIG. 10 illustrates an additional flow chart or method for providing a decentralized and distributed secure home subscriber server/service from the perspective of a database device of distributed database devices in accordance with aspects of the subject disclosure FIG. 11 provides illustration of a time sequence chart for the events that occur between a mobile device, a base station device, and a database device of distributed database devices in accordance with aspects of the subject disclosure.

FIG. 10 illustrates a further method 1000 for providing or supplying a decentralized and distributed secure home subscriber server/service in accordance with an additional embodiment. Method 1000, in accordance with an embodiment, can be implemented on, or by, a distributed database device to effectuate the mutual authentication aspect described above. Accordingly, at 1002 the distributed database device can receive from a base station device (e.g., base station device 102) an identifier associated with a mobile device. At 1004, the distributed database device can, as a function of the identifier, search through its records to identify a public cryptographic key associated with the supplied identifier. At 1006, the distributed database device can return the public cryptographic key to the base station device. Further, at 1008, the distributed database device can send (e.g., via the base station device), to the mobile device (e.g., the mobile device that initially sent the identifier at act 1002) a database tuple comprising an identifier associated with the base station device and a public cryptographic key that is associated with and utilized by the base station device.

Figure 11:
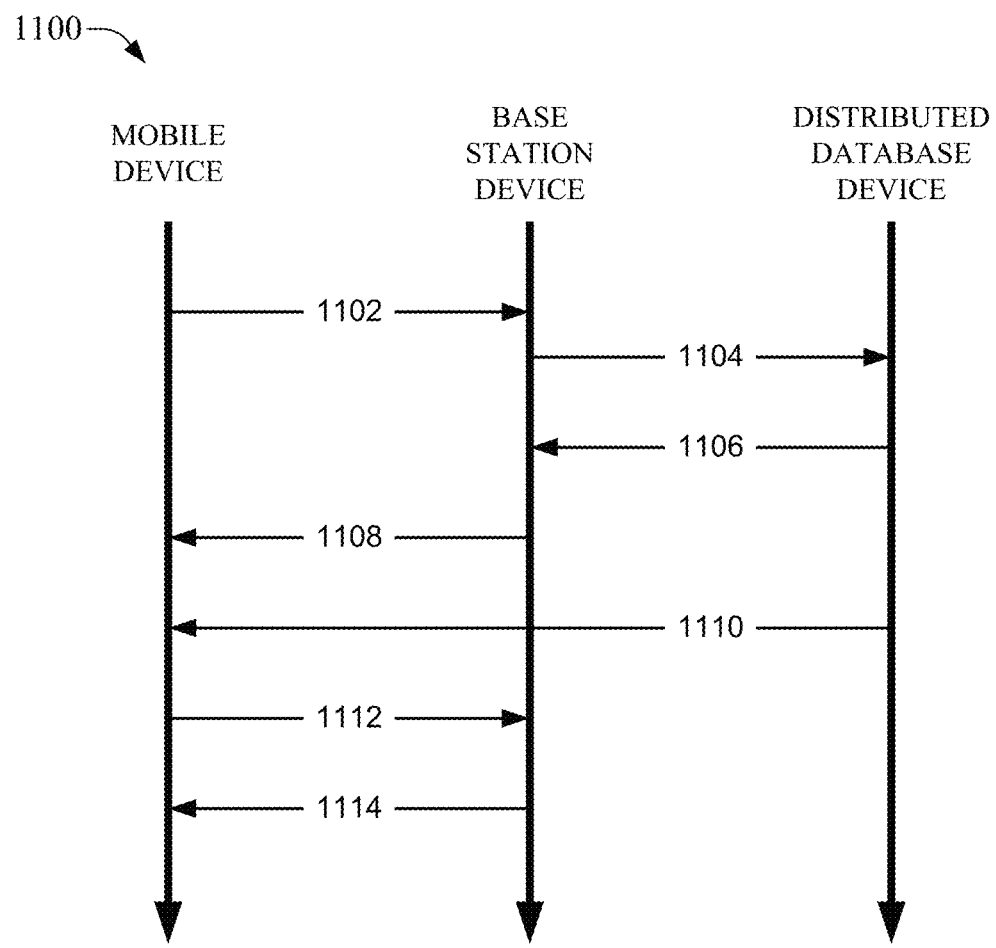

FIG. 11 provides illustration of a time sequence chart 1100 for the events that occur between a mobile device, a base station device, and a database device associated with a distributed database device in accordance with the mutual authentication aspects/embodiments described above. As illustrated, at 1102, a mobile device can send its identifier (e.g., international mobile subscriber identifier (IMSI)) to a base station device. At 1104 the base station device forwards the received identifier to the database device. At this point, the database device can search through its database records (e.g. database tuples) to identify a record that corresponds with the received identifier. The database device then forwards a public cryptographic key associated with the identifier back to the base station device. On receiving the public cryptographic key associated with the identifier, the base station device can generate a first nonce string and thereafter encrypt the first nonce string using the public cryptographic key received from the database device. At 1108, the base station device can send the encrypted first nonce string to the mobile device, whereupon the mobile device decrypts the received encrypted first nonce string using a private cryptographic key to obtain the first nonce string. At 1110, the database device can forward to the mobile device a database tuple that can comprise an identifier of the base station device and a public cryptographic key that is associated with the base station device. At this point the mobile device can verify the legitimacy of the base station device by, for example, encrypting the first nonce string received from the base station device with a pre-provisioned public cryptographic key associated with a mobile network operator device, sending to the mobile network operator device the first nonce string now encrypted using the pre-provisioned public cryptographic key associated with the mobile network operator device, and thereafter waiting for the mobile network operator device to respond with an unencrypted first nonce string (e.g., the mobile network operator device on receiving the first nonce string encrypted using the pre-provisioned public cryptographic key associated with the mobile network operator device, decrypts the encrypted first nonce string using a private cryptographic key associated with the mobile network operator device to obtain the first nonce string, at which point the mobile network operator device sends back to the mobile device the first nonce string as verification of the legitimacy of the originating base station device). Having verified the legitimacy of the base station device the mobile device at 1112 can generate a second nonce string, combine the first nonce string that it recently decrypted with the generated second nonce string, encrypt the combination of the first nonce string and the second nonce using the public cryptographic key that is associated with the base station device, and subsequently send the encrypted combination to the base station device. At 1114, the base station device can decrypt, using a private cryptographic key associated with the a station device is, the encrypted combination to extract the first nonce string and the second nonce string. Base station device at this point as a function of having received a valid first nonce string can commence establishing a secure communication channel with the mobile device. Contemporaneously with facilitating the establishment of a secure communication channel with the mobile device, a base station device can encrypt the second nonce string using the public cryptographic key associated with a mobile device and thereafter can send the encrypted second nonce string back to the mobile device, whereupon the mobile device using its private cryptographic key can decrypt the received encrypted second nonce string, and based at least in part on having received a valid second nonce string can establish secure communications with a base station device.

It should be noted in the context the foregoing that while the disclosed database devices have been described and depicted as being associated with a base station device (e.g., base station device 102), the subject application is not necessarily so limited, as a plurality of distributed database devices can nevertheless be associated with a multiplicity of alternate/disparate and remotely located base station devices without departing from the generality and intent of the subject application. Moreover, the content associated with each of these pluralities of geographically diversely located and distributed database devices can each be similar, though not necessarily identical. Additionally, it should also be noted that within the described network topology, in order to obviate risks associated with distributed denial of service attacks and to ensure that there exists no single point of failure within the network topology, the distributed database devices can be associated with many disparate devices that can have been distributed/located throughout a mobile network operator controlled network topology.

Figure 12:
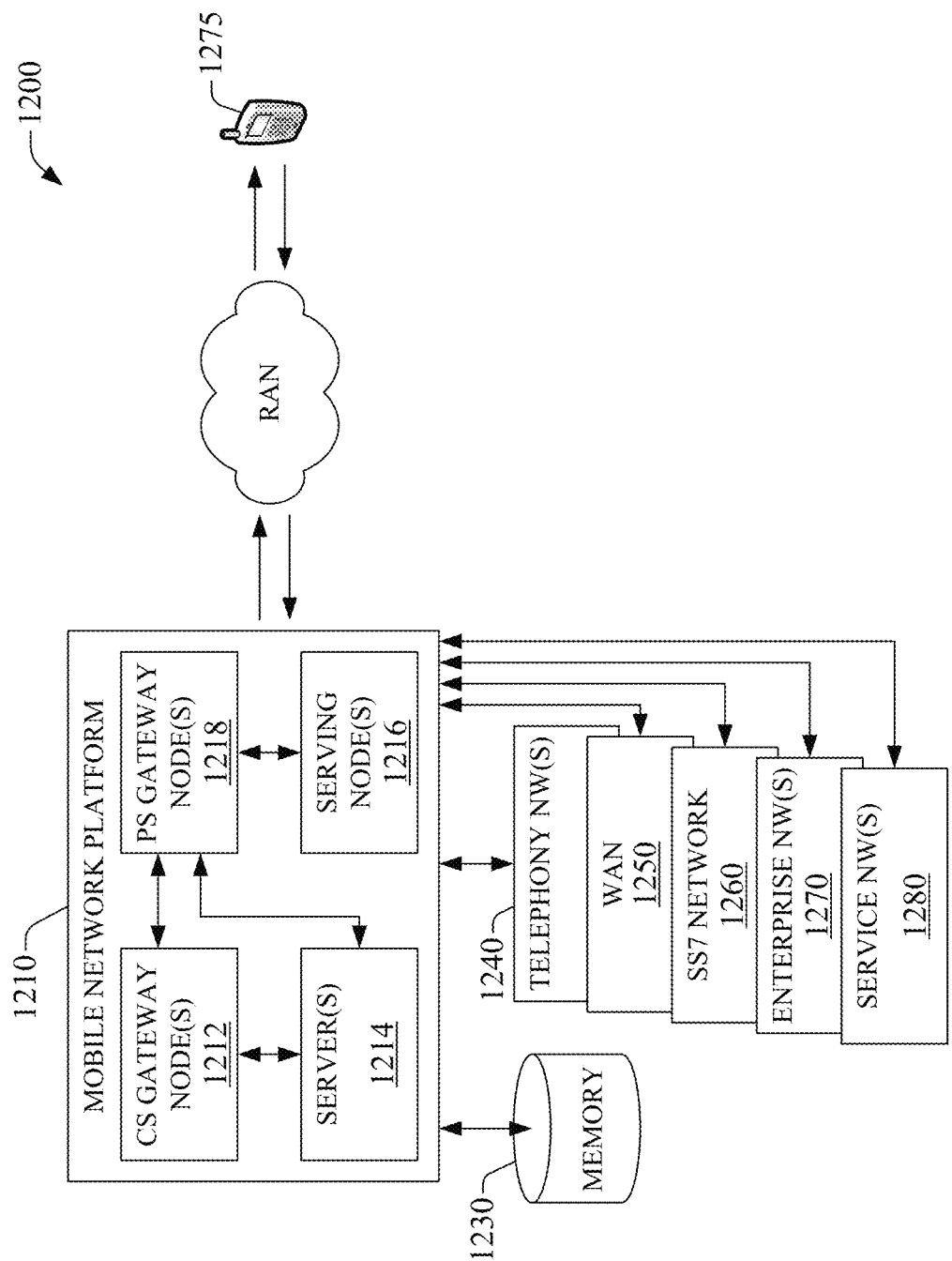
FIG. 12 is a block diagram of an example embodiment of a mobile network platform to implement and exploit various features or aspects of the subject disclosure.

FIG. 12 presents an example embodiment 1200 of a mobile network platform 1210 that can implement and exploit one or more aspects of the disclosed subject matter described herein. Generally, wireless network platform 1210 can include components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, wireless network platform 1210 can be included in telecommunications carrier networks, and can be considered carrier-side components as discussed elsewhere herein. Mobile network platform 1210 includes CS gateway node(s) 1212 which can interface CS traffic received from legacy networks like telephony network(s) 1240 (e.g., public switched telephone network (PSTN), or public land mobile network (PLMN)) or a signaling system #7 (SS7) network 1270. Circuit switched gateway node(s) 1212 can authorize and authenticate traffic (e.g., voice) arising from such networks. Additionally, CS gateway node(s) 1212 can access mobility, or roaming, data generated through SS7 network 1270; for instance, mobility data stored in a visited location register (VLR), which can reside in memory 1230. Moreover, CS gateway node(s) 1212 interfaces CS-based traffic and signaling and PS gateway node(s) 1218. As an example, in a 3GPP UMTS network, CS gateway node(s) 1212 can be realized at least in part in gateway GPRS support node(s) (GGSN). It should be appreciated that functionality and specific operation of CS gateway node(s) 1212, PS gateway node(s) 1218, and serving node(s) 1216, is provided and dictated by radio technology(ies) utilized by mobile network platform 1210 for telecommunication.

In addition to receiving and processing CS-switched traffic and signaling, PS gateway node(s) 1218 can authorize and authenticate PS-based data sessions with served mobile devices. Data sessions can include traffic, or content(s), exchanged with networks external to the wireless network platform 1210, like wide area network(s) (WANs) 1250, enterprise network(s) 1270, and service network(s) 1280, which can be embodied in local area network(s) (LANs), can also be interfaced with mobile network platform 1210 through PS gateway node(s) 1218. It is to be noted that WANs 1250 and enterprise network(s) 1260 can embody, at least in part, a service network(s) like IP multimedia subsystem (IMS). Based on radio technology layer(s) available in technology resource(s) 1217, packet-switched gateway node(s) 1218 can generate packet data protocol contexts when a data session is established; other data structures that facilitate routing of packetized data also can be generated. To that end, in an aspect, PS gateway node(s) 1218 can include a tunnel interface (e.g., tunnel termination gateway (TTG) in 3GPP UMTS network(s) (not shown)) which can facilitate packetized communication with disparate wireless network(s), such as Wi-Fi networks.

In embodiment 1200, wireless network platform 1210 also includes serving node(s) 1216 that, based upon available radio technology layer(s) within technology resource(s) 1217, convey the various packetized flows of data streams received through PS gateway node(s) 1218. It is to be noted that for technology resource(s) 1217 that rely primarily on CS communication, server node(s) can deliver traffic without reliance on PS gateway node(s) 1218; for example, server node(s) can embody at least in part a mobile switching center. As an example, in a 3GPP UMTS network, serving node(s) 1216 can be embodied in serving GPRS support node(s) (SGSN).

For radio technologies that exploit packetized communication, server(s) 1214 in wireless network platform 1210 can execute numerous applications that can generate multiple disparate packetized data streams or flows, and manage (e.g., schedule, queue, format . . . ) such flows. Such application(s) can include add-on features to standard services (for example, provisioning, billing, customer support . . . ) provided by wireless network platform 1210. Data streams (e.g., content(s) that are part of a voice call or data session) can be conveyed to PS gateway node(s) 1218 for authorization/authentication and initiation of a data session, and to serving node(s) 1216 for communication thereafter. In addition to application server, server(s) 1214 can include utility server(s), a utility server can include a provisioning server, an operations and maintenance server, a security server that can implement at least in part a certificate authority and firewalls as well as other security mechanisms, and the like. In an aspect, security server(s) secure communication served through wireless network platform 1210 to ensure network's operation and data integrity in addition to authorization and authentication procedures that CS gateway node(s) 1212 and PS gateway node(s) 1218 can enact. Moreover, provisioning server(s) can provision services from external network(s) like networks operated by a disparate service provider; for instance, WAN 1250 or Global Positioning System (GPS) network(s) (not shown). Provisioning server(s) can also provision coverage through networks associated to wireless network platform 1210 (e.g., deployed and operated by the same service provider), such as femto-cell network(s) (not shown) that enhance wireless service coverage within indoor confined spaces and offload radio access network resources in order to enhance subscriber service experience within a home or business environment by way of UE 1275.

It is to be noted that server(s) 1214 can include one or more processors configured to confer at least in part the functionality of macro network platform 1210. To that end, the one or more processor can execute code instructions stored in memory 1230, for example. It is should be appreciated that server(s) 1214 can include a content manager 1215, which operates in substantially the same manner as described hereinbefore.

In example embodiment 1200, memory 1230 can store information related to operation of wireless network platform 1210. Other operational information can include provisioning information of mobile devices served through wireless platform network 1210, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 1230 can also store information from at least one of telephony network(s) 1240, WAN 1250, enterprise network(s) 1260, or SS7 network 1270. In an aspect, memory 1230 can be, for example, accessed as part of a data store component or as a remotely connected memory store.

Figure 13:
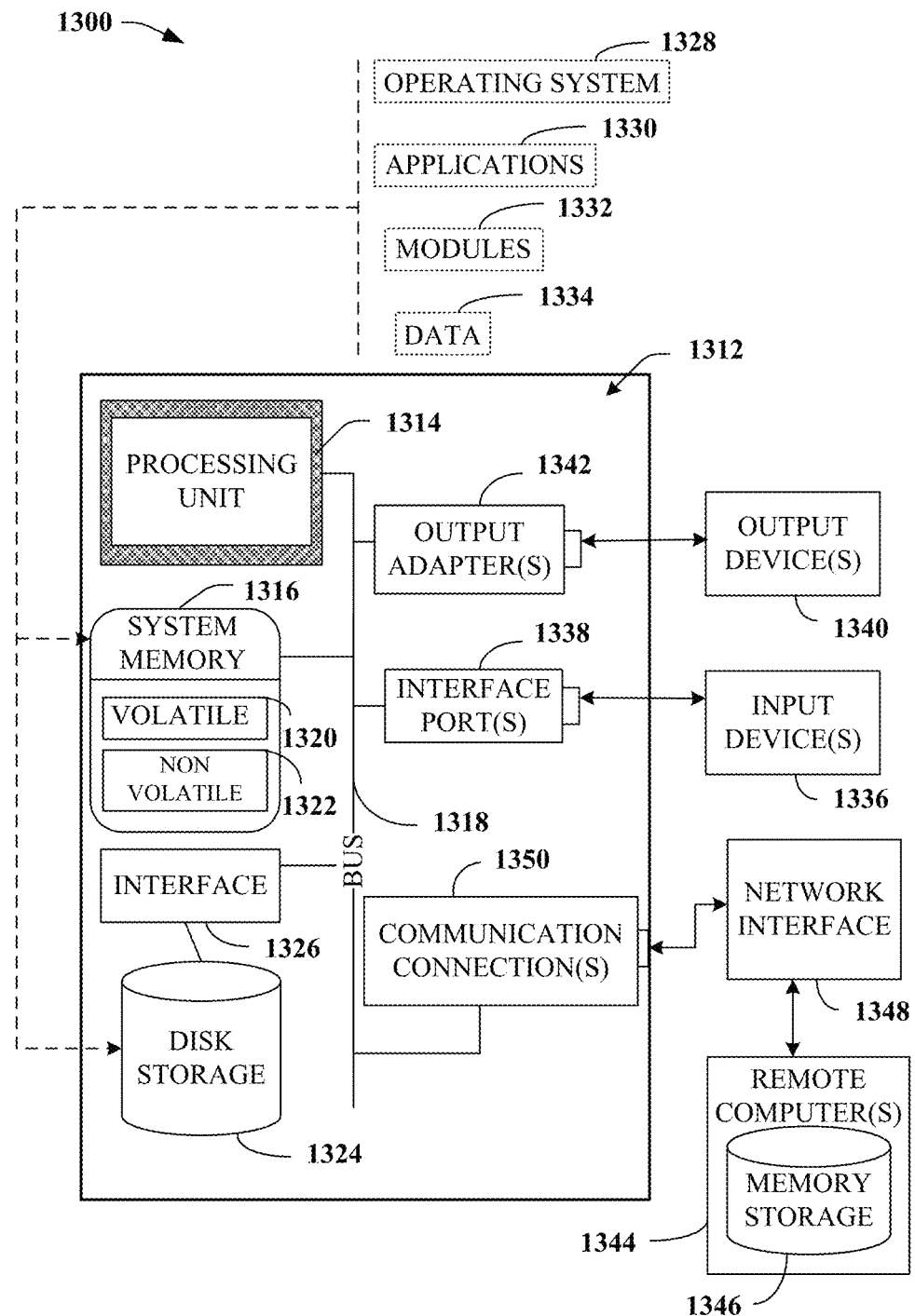
FIG. 13 illustrates a block diagram of a computing system operable to execute the disclosed systems and methods in accordance with an embodiment.

In order to provide a context for the various aspects of the disclosed subject matter, FIG. 13, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules include routines, programs, components, data structures, etc. that perform particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory, by way of illustration, and not limitation, volatile memory 1320 (see below), non-volatile memory 1322 (see below), disk storage 1324 (see below), and memory storage 1346 (see below).

Further, nonvolatile memory can be included in read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, including single-processor or multiprocessor computer systems, mini-computing devices, mainframe computers, as well as personal computers, hand-held computing devices (e.g., PDA, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 13 illustrates a block diagram of a computing system 1300 operable to execute the disclosed systems and methods in accordance with an embodiment. Computer 1312, which can be, for example, part of the hardware of system 130, includes a processing unit 1314, a system memory 1316, and a system bus 1318. System bus 1318 couples system components including, but not limited to, system memory 1316 to processing unit 1314. Processing unit 1314 can be any of various available processors. Dual microprocessors and other multiprocessor architectures also can be employed as processing unit 1314.

System bus 1318 can be any of several types of bus structure(s) including a memory bus or a memory controller, a peripheral bus or an external bus, and/or a local bus using any variety of available bus architectures including, but not limited to, Industrial Standard Architecture (ISA), Micro-Channel Architecture (MSA), Extended ISA (EISA), Intelligent Drive Electronics, VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1194), and Small Computer Systems Interface (SCSI).

System memory 1316 can include volatile memory 1320 and nonvolatile memory 1322. A basic input/output system (BIOS), containing routines to transfer information between elements within computer 1312, such as during start-up, can be stored in nonvolatile memory 1322. By way of illustration, and not limitation, nonvolatile memory 1322 can include ROM, PROM, EPROM, EEPROM, or flash memory. Volatile memory 1320 includes RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1312 can also include removable/non-removable, volatile/non-volatile computer storage media. FIG. 13 illustrates, for example, disk storage 1324. Disk storage 1324 includes, but is not limited to, devices like a magnetic disk drive, floppy disk drive, tape drive, flash memory card, or memory stick. In addition, disk storage 1324 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1324 to system bus 1318, a removable or non-removable interface is typically used, such as interface 1326.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible media which can be used to store desired information. In this regard, the term "tangible" herein as may be applied to storage, memory or computer-readable media, is to be understood to exclude only propagating intangible signals per se as a modifier and does not relinquish coverage of all standard storage, memory or computer-readable media that are not only propagating intangible signals per se. In an aspect, tangible media can include non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. For the avoidance of doubt, the term "computer-readable storage device" is used and defined herein to exclude transitory media. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

It can be noted that FIG. 13 describes software that acts as an intermediary between users and computer resources described in suitable operating environment 1300. Such software includes an operating system 1328. Operating system 1328, which can be stored on disk storage 1324, acts to control and allocate resources of computer system 1312. System applications 1330 take advantage of the management of resources by operating system 1328 through program modules 1332 and program data 1334 stored either in system memory 1316 or on disk storage 1324. It is to be noted that the disclosed subject matter can be implemented with various operating systems or combinations of operating systems.

A user can enter commands or information into computer 1312 through input device(s) 1336. As an example, mobile device 132 and/or portable device 134 can include a user interface embodied in a touch sensitive display panel allowing a user to interact with computer 1312. Input devices 1336 include, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1314 through system bus 1318 by way of interface port(s) 1338. Interface port(s) 1338 include, for example, a serial port, a parallel port, a game port, a universal serial bus (USB), an infrared port, a Bluetooth port, an IP port, or a logical port associated with a wireless service, etc. Output device(s) 1340 use some of the same type of ports as input device(s) 1336.

Thus, for example, a USB port can be used to provide input to computer 1312 and to output information from computer 1312 to an output device 1340. Output adapter 1342 is provided to illustrate that there are some output devices 1340 like monitors, speakers, and printers, among other output devices 1340, which use special adapters. Output adapters 1342 include, by way of illustration and not limitation, video and sound cards that provide means of connection between output device 1340 and system bus 1318. It should be noted that other devices and/or systems of devices provide both input and output capabilities such as remote computer(s) 1344.

Computer 1312 can operate in a networked environment using logical connections to one or more remote computers, such as remote computer(s) 1344. Remote computer(s) 1344 can be a personal computer, a server, a router, a network PC, cloud storage, cloud service, a workstation, a microprocessor based appliance, a peer device, or other common network node and the like, and typically includes many or all of the elements described relative to computer 1312.

For purposes of brevity, only a memory storage device 1346 is illustrated with remote computer(s) 1344. Remote computer(s) 1344 is logically connected to computer 1312 through a network interface 1348 and then physically connected by way of communication connection 1350. Network interface 1348 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit-switching networks like Integrated Services Digital Networks (ISDN) and variations thereon, packet switching networks, and Digital Subscriber Lines (DSL). As noted below, wireless technologies may be used in addition to or in place of the foregoing.

Communication connection(s) 1350 refer(s) to hardware/software employed to connect network interface 1348 to bus 1318. While communication connection 1350 is shown for illustrative clarity inside computer 1312, it can also be external to computer 1312. The hardware/software for connection to network interface 1348 can include, for example, internal and external technologies such as modems, including regular telephone grade modems, cable modems and DSL modems, ISDN adapters, and Ethernet cards.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point (AP)," "base station," "NodeB," "evolved Node B (eNodeB)," "home Node B (HNB)," "home access point (HAP)," "cell device," "sector," "cell," and the like, are utilized interchangeably in the subject application, and refer to a wireless network component or appliance that serves and receives data, control, voice, video, sound, gaming, or substantially any data-stream or signaling-stream to and from a set of subscriber stations or provider enabled devices. Data and signaling streams can include packetized or frame-based flows.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. UEs do not normally connect directly to the core networks of a large service provider but can be routed to the core by way of a switch or radio area network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g. call transfer) or implicitly (e.g., call waiting). It is to be noted that service "execution" may or may not be a core network functionality as third party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include Geocast technology; broadcast technologies (e.g., sub-Hz, ELF, VLF, LF, MF, HF, VHF, UHF, SHF, THz broadcasts, etc.); Ethernet; X.25; powerline-type networking (e.g., PowerLine AV Ethernet, etc.); femto-cell technology; Wi-Fi; Worldwide Interoperability for Microwave Access (WiMAX); Enhanced General Packet Radio Service (Enhanced GPRS); Third Generation Partnership Project (3GPP or 3G) Long Term Evolution (LTE); 3GPP Universal Mobile Telecommunications System (UMTS) or 3GPP UMTS; Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); GSM Enhanced Data Rates for GSM Evolution (EDGE) Radio Access Network (RAN) or GERAN; UMTS Terrestrial Radio Access Network (UTRAN); or LTE Advanced.

What has been described above includes examples of systems and methods illustrative of the disclosed subject matter. It is, of course, not possible to describe every combination of components or methods herein. One of ordinary skill in the art may recognize that many further combinations and permutations of the disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A device, comprising:
   a processor; and
   a memory that stores executable instructions that, when executed by the processor, facilitate performance of operations, comprising:
   receiving a database tuple comprising a cell identifier and a first encryption key, wherein the cell identifier and the first encryption key are associated with a first device, and wherein the database tuple is stored as crypto-currency transactional data by a network device associated with a mobile network operator identity;
   sending, to a second device, data representing a nonce string and a generated nonce string; and
   facilitating establishing a communication channel between the first device and the second device in response to receiving the generated nonce string from the second device.

2. The device of claim 1, wherein the nonce string is encrypted using a public key associated with the second device.

3. The device of claim 2, wherein the public key associated with the second device is received from a database device of a group of database devices.

4. The device of claim 3, wherein the public key associated with the second device is received in response to sending an identifier associated with a second device to the group of database devices.

5. The device of claim 4, wherein the identifier and the public key are stored as the database tuple to the group of database devices, the database tuple is encrypted using a private key associated with a mobile network operator device, and the mobile network operator device facilitates storage of the database tuple to the group of database devices.

6. The device of claim 1, wherein the data are encrypted using a public key associated with the device.

7. The device of claim 6, wherein the operations further comprise decrypting the data using a private key associated with the device.

8. The device of claim 7, wherein the operations further comprise facilitating sending the generated nonce string to the second device.

9. The device of claim 8, wherein the generated nonce string is encrypted with the public key associated with the second device.

10. A method, comprising:
    receiving, by a device comprising a processor, a database tuple comprising a cell identifier and a first encryption key, wherein the cell identifier and the first encryption key are associated with a first device, and wherein the database tuple is stored as crypto-currency transactional data by a network device associated with a mobile network operator identity;
    sending, by the device, to a second device, data representing a nonce string and a generated nonce string; and
    facilitating, by the device, establishing a communication link between the first device and the second device in response to receiving the generated nonce string from the second device.

11. The method of claim 10, wherein nonce string is received in response to sending, by the device, an international mobile subscriber identifier to the first device.

12. The method of claim 10, wherein the nonce string is received as an encrypted nonce string, and further comprising using, by the device, and second encryption key to decrypt the encrypted nonce string to retrieve the nonce string.

13. The method of claim 12, wherein the second encryption key is stored to an integrated circuit device associated with the device.

14. The method of claim 12, further comprising using, by the device, the first encryption key associated with the first device to encrypt the data.

15. The method of claim 12, further comprising using, by the device, the second encryption key to decrypt a previously encrypted version of the generated nonce string, wherein the previously encrypted version of the generated nonce string having been encrypted by the second device using a private encryption key associated with second device.

16. A machine-readable storage medium, comprising executable instructions that, when executed by a processor, facilitate performance of operations, comprising:

receiving a database tuple comprising a cell identifier and a first encryption key, wherein the cell identifier and the first encryption key are associated with a first device, and wherein the database tuple is stored as cryptocurrency transactional data by a network device associated with a mobile network operator identity;

sending to a second device, data representing a nonce string and a generated nonce string; and facilitating establishing a communication link between the first device and the second device in response to receiving the generated nonce string from the second device.

17. The machine-readable storage medium of claim 16, wherein the database tuple is a first database tuple, and wherein the operations further comprise facilitating sending the generated nonce string to the second device included in a second database tuple.

18. The machine-readable storage medium of claim 17, wherein the second database tuple comprises a cell identifier associated with the first device and a second encryption key associated with the first device.

19. The machine-readable storage medium of claim 16, wherein the nonce string is received from the first device.

20. The machine-readable storage medium of claim 16, wherein the nonce string represents an international mobile subscriber identifier string associated with a subscriber identification module card.

* * * * *